(12) United States Patent
Zanzig et al.

(10) Patent No.: US 7,714,055 B2
(45) Date of Patent: May 11, 2010

(54) TIRE WITH COMPONENT COMPRISED OF A BLEND OF POLYBUTADIENE RUBBER AND COMPOSITE OF STYRENE/BUTADIENE ELASTOMER WHICH CONTAINS EXFOLIATED CLAY PLATELETS

(75) Inventors: David John Zanzig, Bertrange (LU); Xiaoping Yang, Streetsboro, OH (US); Martin Paul Cohen, Fairlawn, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 509 days.

(21) Appl. No.: 10/923,911

(22) Filed: Aug. 23, 2004

(65) Prior Publication Data

US 2005/0065265 A1    Mar. 24, 2005

Related U.S. Application Data

(60) Provisional application No. 60/504,425, filed on Sep. 18, 2003.

(51) Int. Cl.
*B60C 1/00* (2006.01)
*C08K 3/34* (2006.01)
*C08K 3/04* (2006.01)

(52) U.S. Cl. ............ 524/445; 523/205; 524/262; 524/492; 524/495; 524/526; 152/905

(58) Field of Classification Search ........... 524/445, 524/447, 492, 493, 495, 186; 152/905; 523/205
See application file for complete search history.

(56) References Cited

U.S. PATENT DOCUMENTS

| | | | | |
|---|---|---|---|---|
| 4,519,430 A * | 5/1985 | Ahmad et al. | .......... | 152/209.1 |
| 4,522,970 A * | 6/1985 | Scriver et al. | .......... | 524/447 |
| 5,082,901 A * | 1/1992 | Linster | .......... | 525/237 |
| 5,284,898 A * | 2/1994 | Thise | .......... | 524/495 |
| 5,451,646 A * | 9/1995 | Castner | .......... | 526/137 |
| 6,127,468 A | 10/2000 | Cruse et al. | .......... | 524/225 |
| 6,204,339 B1 | 3/2001 | Waldman et al. | .......... | 524/350 |
| 6,414,061 B1 | 7/2002 | Cruse et al. | .......... | 524/262 |
| 6,528,673 B2 | 3/2003 | Cruse et al. | .......... | 556/427 |
| 6,608,125 B2 | 8/2003 | Cruse et al. | .......... | 524/262 |
| 6,759,464 B2 * | 7/2004 | Ajbani et al. | .......... | 524/445 |
| 6,818,693 B2 * | 11/2004 | Heinrich et al. | .......... | 524/445 |
| 6,861,462 B2 * | 3/2005 | Parker et al. | .......... | 524/445 |
| 2003/0144401 A1 | 7/2003 | Ajbani et al. | .......... | 524/445 |

FOREIGN PATENT DOCUMENTS

| EP | 1125766 | 8/2001 |
|---|---|---|
| EP | 1321489 | 12/2002 |

OTHER PUBLICATIONS

European Search Report.

* cited by examiner

*Primary Examiner*—Vickey Nerangis
(74) *Attorney, Agent, or Firm*—Henry C. Young, Jr.

(57) ABSTRACT

Pneumatic rubber tire having at least one component of a polybutadiene-rich rubber composition comprised of a blend of a continuous phase of a specialized cis 1,4-polybutadiene rubber and a dispersed phase comprised of a composite of styrene/butadiene elastomer which contains a dispersion of at least partially exfoliated, intercalated, clay platelets, wherein said cis 1,4-polybutadiene rubber and styrene/butadiene elastomer have spatially defined glass transition temperatures, wherein said blend contains amorphous silica and carbon black reinforcement. Such tire component may be, for example, a circumferential tread having a running surface intended to be ground-contacting or a sidewall insert.

4 Claims, No Drawings

TIRE WITH COMPONENT COMPRISED OF A BLEND OF POLYBUTADIENE RUBBER AND COMPOSITE OF STYRENE/BUTADIENE ELASTOMER WHICH CONTAINS EXFOLIATED CLAY PLATELETS

The Applicants hereby incorporate by reference prior U.S. Provisional Application Ser. No. 60/504,425, filed on Sep. 18, 2003.

FIELD OF THE INVENTION

Pneumatic rubber tire having at least one component of a polybutadiene-rich rubber composition comprised of a blend of a continuous phase of a specialized cis 1,4-polybutadiene rubber and a dispersed phase comprised of a composite of styrene/butadiene elastomer which contains a dispersion of at least partially exfoliated, intercalated, clay platelets, wherein said cis 1,4-polybutadiene rubber and styrene/butadiene elastomer have spatially defined glass transition temperatures, wherein said blend contains amorphous silica and carbon black reinforcement. Such tire component may be, for example, a circumferential tread having a running surface intended to be ground-contacting or a sidewall insert.

BACKGROUND OF THE INVENTION

Pneumatic rubber tires, particularly high performance tires, are normally desired to have treads of a rubber composition which will provide good traction on the road.

An emphasis upon improving a traction characteristic of a tire tread rubber composition often compromises a tire tread's treadwear and/or rolling resistance characteristic as is well known to those having skill in such art.

For example, rubber compositions designed to specifically emphasize improved traction for a tire tread's running surface often present a relatively reduced abrasion resistance physical property and associated relatively greater treadwear property and typically exhibit a relatively high, single, glass transition temperature (Tg) of above $-50°$ C. and usually within a range of about $0°$ C. to about $-50°$ C.

Conversely, rubber compositions designed to specifically emphasize good resistance to abrasion for a tire tread's running surface often presents relatively reduced tire tread traction and also typically exhibit a single low Tg of below $-50°$ C.

Therefore, a tread rubber composition exhibiting a desirable balance between traction and treadwear is difficult to achieve where the rubber composition exhibits only a single glass transition temperature (Tg).

In U.S. Pat. No. 5,723,530, it is mentioned that as tire is desired having a tread where good traction is desired yet still having an acceptable treadwear.

In U.S. Pat. No. 5,723,530, a tire is provided with a tread which is composed of four elastomers, of which two of the elastomers have clearly separated, therefore spatially defined, individual glass transition temperatures (Tg's). In particular the tread rubber composition is comprised of (A) 25 to 60 phr of styrene/butadiene rubber with Tg in a range of $-15°$ C. to $-45°$ C.;

(B) 5 to 40 phr of medium vinyl polybutadiene rubber with vinyl content of 40 to 65 and a Tg in a range of $-45°$ C. to $-65°$ C.;

(C) 20 to 40 phr of cis 1,4-polybutadiene rubber with a Tg in a range of $-95°$ C. to $-105°$ C.; and (D) 5 to 30 phr of cis 1,4-polyisoprene rubber having a Tg in a range of $-65°$ C. to $-70°$ C.

The Tg of the cis 1,4-polybutadiene rubber is required to be at least $50°$ C. lower than the Tg of the styrene/butadiene rubber. A carbon black with required Iodine and DBP (dibutylphthalate) values is also specified. It is readily seen in this patent disclosure that a tire tread rubber composition is provided which exhibits dual Tg's which contains less than 45 phr of cis 1,4-polybutadiene rubber. Thus, U.S. Pat. No. 5,723,530, while it is directed to a tread rubber composition which exhibits dual Tg's, it is not directed to a tire tread rubber composition which is comprised of a rubber composition which contains greater than 45 phr of cis 1,4-polybutadiene rubber.

U.S. Pat. Ser. No. 6,465,560 is directed to a cis 1,4-polybutadiene rich rubber composition for a tire tread rubber containing a minor portion of high styrene containing styrene/butadiene rubber with Tg's sufficiently spaced apart that the two elastomers are, basically, substantially incompatible with each other, as indicated by a plot of Tg versus temperature yields two distinct Tg maximums together with particulate reinforcement as an amorphous silica together with a high structure carbon reinforcement of specified carbon black Iodine value and DBP (dibutylphthalate) value characterization.

In the description of this invention, terms such as "compounded rubber", "rubber compound" and "compound", if used herein, refer to rubber compositions composed of one or more elastomers blended with various ingredients, including curatives such as sulfur and cure accelerators. The terms "elastomer" and "rubber" might be used herein interchangeably. It is believed that all of such terms are well known to those having skill in such art.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined by a differential scanning calorimeter (DSC) at a temperature rate of increase of $10°$ C. per minute (ASTM D3418-99), a method of determining a Tg of an elastomer which is well known to those having skill in such art.

DISCLOSURE AND PRACTICE OF THE INVENTION

In accordance with this invention, a pneumatic rubber tire is provided having a circumferential rubber tread where said tread is a rubber composition comprised of a blend of, based on parts by weight per 100 parts by weight (phr), (A) conjugated diene-based elastomers comprised of
  (1) from 55 to about 85 phr of cis 1,4-polybutadiene rubber (BR) having a cis 1,4-microstructure content of at least 95 percent and a single Tg within a range of about $-98°$ C. to about $-107°$ C.;
  (2) about 15 to about 45 phr of at least one emulsion polymerization prepared elastomeric high styrene-containing styrene/butadiene copolymer rubber having a bound styrene content in a range of about 35 to about 55 percent and a single Tg in within a range of from about $-20°$ C. to about $-45°$ C., as a composite thereof containing from about 1 to about 80, alternately from about 1 to about 45, parts by weight of at least partially exfoliated, intercalated clay particles per 100 parts by weight of the styrene/butadiene copolymer rubber as a dispersion therein, wherein the Tg of said cis 1,4-polybutadiene elastomer is at least 50° C. lower than the Tg of said emulsion polymerization derived high styrene containing styrene/butadiene elastomer; and (B) about 35 to about 110, alternately about 60 to about 90, phr of reinforcing filler comprised of (1) amorphous silica, or (2) high structure carbon black, or (3) from about 5 to about 105 phr amorphous silica and from about 5 to about 105 phr of high structure carbon black reinforcing filler;

wherein said high structure carbon black is characterized by having an Iodine value in a range of about 116 to about 135, g/kg together with a DBP (dibutylphthalate) value in a range of about 125 to about 140, cm$^3$/100 g; and optionally if silica is used;

(C) a coupling agent having a moiety reactive with hydroxyl groups contained on the surface of said silica and said clay particles and another moiety interactive with at least one of said diene-based elastomers.

In practice, said cis 1,4-polybutadiene rubber (BR) is a specialized, branched BR having cis 1,4-content in a range of from about 96 to about 98 percent and contains a degree of branching. Such BR may be prepared by polymerizing 1,3-butadiene monomer in the presence of organonickel compound as a nickel salt of a carboxylic acid, organoaluminum compound as a trialkylaluminum compound, hydrogen fluoride and para-styrenated diphenylamine, wherein said organoaluminum compound and said fluorine containing compound are brought together in the presence of said para-styrenated diphenylamine. Such specialized BR may have a Mooney (ML+4) viscosity at 100° C. in its unvulcanized state in a range of from about 35 to about 45 and a cold flow value of less than 1.2 mg/minute. Such specialized BR may be referred to herein as a Branched BR as it is considered herein as containing a degree of branching. For the purposes of describing this invention, the term "BR" is usually intended to mean the specialized BR, or branched BR, unless otherwise indicated.

For a more detailed description of preparation of said specialized BR, U.S. Pat. No. 5,451,646 is hereby incorporated herein by reference in its entirety.

In practice said coupling agent may be an organosilane polysulfide such as, for example, a bis(3-trialkoxysilylalkyl) polysulfide which contains an average of from 2 to 4 connecting sulfur atoms in its polysulfidic bridge. Representative of such coupling agent is bis(3-triethoxysilylpropyl) polysulfide which contains an average of from 2 to 4 connecting sulfur atoms in its polysulfidic bridge, alternately an average of from about 2 to about 2.6 or an average of from about 3 to about 4, connecting sulfur atoms in its polysulfidic bridge.

Alternatively, said coupling agent may be used, for example, which contains a mercapto functionality for reaction with the diene-based elastomer(s) such as, for example, a mercaptopropyl triethoxysilane. Additionally, coupling agents may be used which contain, for example a mercapto functionality which has been blocked by a moiety which is itself labile and in which the blocked mercapto functionality is deblocked under the rubber vulcanization conditions of elevated temperature to provide the rubber reactive mercapto functionality.

Alternately, said coupling agent may be provided as a pre-formed reaction product of said amorphous silica, preferably in a form of a precipitated silica, and said coupling agent such as, for example, said bis(3-trialkylsilylalkyl) polysulfide, said organomercaptoalkoxysilane and said organomercaptoalkoxysilane where the mercapto functionality is blocked with a material which may be deblocked at an elevated temperature.

The said rubber composition may alternately contain from about 5 to about 25 phr of at least one additional diene-based elastomer selected from polymers and copolymers of at least one of isoprene and 1,3-butadiene and copolymers of styrene and/or alpha methylstyrene and at least one of isoprene and 1,3-butadiene; so long as said additional diene-based elastomer has a Tg in a range of from about −25° C. to about −65° C., and wherein said rubber composition is comprised of at least 55 phr of said BR (having a Tg in a range of from about −98° C. to about −107° C. so that even said additional diene-based elastomer has a Tg of greater than 30° C. lower than, and therefore spaced apart from, the Tg of the BR).

By requiring the rubber composition to be comprised of at least 55 phr of the BR, in combination with the aforesaid immiscibility of the respective elastomers due to a combination of the significantly spaced apart Tg's combined with the high styrene requirement of the styrene/butadiene elastomer, it is intended that the BR is the continuous phase of the rubber composition insofar as the elastomers are concerned.

Representative examples of such additional diene-based elastomers are, for example, cis 1,4-polyisoprene rubber particularly including natural cis 1,4-polyisoprene rubber, high vinyl polybutadiene elastomer which has from about 30 to about 90 percent vinyl 1,2-content, so long as they have a Tg within a range of about −25° C. and −65° C.

An important aspect of this invention is the inclusion in a rubber composition for a tire tread of at least partially exfoliated, intercalated, clay platelets wherein the clay platelets are introduced into the rubber composition as a composite of the emulsion polymerization prepared styrene/butadiene copolymer elastomer and the dispersion therein of partially exfoliated clay platelets.

A further important aspect of the invention is that the rubber composition is provided as a blend of a major phase of the BR having a single Tg within a range of from −98° C. to −107° C. with a minor phase of the composite of emulsion polymerization prepared high styrene, styrene/butadiene copolymer (having a Tg at least 50° C. higher than the Tg of said BR) and a dispersion therein of the at least partially exfoliated, intercalated, clay platelets.

The inclusion of the exfoliated clay platelets in the rubber composition is considered herein to be significant because it is considered herein to provide significant reinforcement for the dispersed styrene/butadiene rubber phase of the rubber composition.

A further significant aspect of the invention is, in combination with the aforesaid inclusion of the clay platelets, that the blend of two phases of elastomers in the rubber composition is required as being comprised of a first major (continuous) phase being the major portion of the BR with its very low Tg characteristic and minor (dispersed) phase being the minor portion of emulsion polymerization prepared, high styrene, styrene/butadiene elastomer with its significantly higher Tg spaced apart from the Tg of the BR by at least 50° C. so that the BR and said styrene/butadiene elastomer are, basically incompatible with each other.

This is considered herein to be significant because the relatively incompatible two-phases of the rubber composition helps to maximize performance of the rubber composition. In particular, it is considered that the relatively continuous major BR phase maximizes the wear, or abrasion, resistance of the rubber composition and the dispersed minor styrene/butadiene rubber composite phase with its dispersed at least partially exfoliated, intercalated clay platelets tends to maximize the tread traction. Further, the styrene/butadiene rubber phase with its aforesaid exfoliated, intercalated clay dispersion is considered herein to add strength and durability to the rubber composition.

A further significant aspect of the invention is the inclusion of an amorphous silica, preferably a precipitated silica, together with a silica coupler to aid in coupling both the silica and the exfoliated clay platelets to the diene-based elastomers.

This is considered herein to be significant because the coupling agent enhances the interaction of the silica and partially exfoliated, intercalated clay platelets with the diene-based elastomer(s) to provide greater reinforcement and strength of the rubber composition and to promote a lower hysteresis of the rubber composition which is considered herein to be beneficial to improve tire tread durability and to improve fuel efficiency of an associated vehicle.

It is to be appreciated that the combination of the BR and the emulsion polymerization prepared high styrene, styrene/butadiene elastomer are in the clear majority insofar as elastomers in the tread rubber are concerned and, moreover, that the Tg of the cis 1,4-polybutadiene rubber is at least 50° C. lower than the Tg of the styrene/butadiene copolymer rubber.

It is to be further appreciated that at least 55 phr of the rubber composition is of the BR and it is desired that at least 15 weight percent of the remaining elastomers have a Tg of at least 50° C. higher than the Tg of the BR, particularly the aqueous emulsion polymerization prepared styrenelbutadiene copolymer.

As hereinbefore discussed, in this manner it is considered herein that the relatively low Tg BR is relatively incompatible with the high Tg aqueous emulsion polymerization prepared high styrene, styrene/butadiene copolymer elastomer so that the major BR phase becomes a continuous phase and the minor significantly higher Tg, high styrene, styrene/butadiene elastomer becomes a discontinuous phase dispersed within the BR continuous phase.

Accordingly, as hereinbefore discussed, it is considered herein that these elastomers of said tread rubber are present in two phases, comprised of the BR major phase, considered herein to be the continuous phase and the minor phase (considered herein to be a relatively incompatible dispersed phase) of the high styrene, styrene/butadiene elastomer composite provided with the dispersion of exfoliated clay platelets.

In practice, the relatively high styrene-containing, emulsion polymerization prepared, styrene/butadiene copolymer elastomer is considered herein to be important to increase hysteresis of the rubber composition which in turn is predictive of increased coefficient of friction, or tread traction, for a tire having such a tread rubber composition. It is desired herein that the bound styrene content be at least 35 percent, based upon the styrene/butadiene elastomer, for the tire tread traction enhancement.

Because the dispersed phase high styrene styrene/butadiene elastomer is relatively immiscible with the continuous phase BR its high hysteresis promotion remains a relatively independent contribution to the physical property of the resulting rubber composition and is not substantially adversely affected by the presence of the said BR.

Similarly, the low Tg abrasion resistance contribution of the BR continuous phase remains a relatively independent contribution to the physical property of the resulting rubber composition and is not substantially adversely affected by the presence of the said styrene/butadiene copolymer elastomer.

It is considered herein to be important to provide the pre-dispersement of the partially exfoliated, intercalated clay platelet reinforcement in the relatively incompatible, minor styrene/butadiene elastomer phase prior to blending with the major BR phase, in order to provide a more uniform dispersement of the reinforcing clay platelets within the styrene/butadiene elastomer to thereby further enhance the aforesaid benefits of the styrene/butadiene elastomer phase of the overall rubber composition.

The composite of said high styrene containing styrene/butadiene copolymer elastomer and dispersion of exfoliated, intercalated clay platelets may be formed, for example, by dispersing a water swelled water swellable clay which has been pre-intercalated with an intercalant such as, for example, a quaternary ammonium salt, into an aqueous emulsion of pre-formed aqueous emulsion polymerization prepared high styrene containing styrene/butadiene elastomer particles followed by coagulating/precipitating the elastomer/clay particles. The clay is intercalated by an ion exchange of the quaternary ammonium salt with cationic exchangeable ions (e.g. sodium ions) contained within the galleries between the stacked platelets of the water swelled clay.

Alternately, such composite may be formed by blending a water slurry of water swelled, water swellable clay, particularly non-intercalated clay, and intercalating the clay in situ within an anionic aqueous emulsion of pre-formed aqueous emulsion polymerization prepared high styrene styrene/butadiene elastomer styrene/butadiene elastomer particles by addition of a polymeric quaternary amine to effect an ion exchange with the cationic exchangeable ions (e.g. sodium ions) within the galleries between stacked platelets of the water swelled clay to thereby intercalate and at least partially exfoliate the intercalated clay into individual exfoliated platelets, usually together with pH reduction by acid addition (e.g. sulfuric acid), coagulating/precipitating the elastomer/exfoliated, intercalated clay particles.

Alternately, such composite may be formed by blending a water slurry of water swelled, water swellable clay, particularly non-intercalated clay, with a cationic aqueous emulsion of pre-formed aqueous emulsion polymerization formed high styrene containing styrene/butadiene elastomer particles with cations on the surface thereof and substantially simultaneously intercalating the clay in situ within emulsion of styrene/butadiene emulsion and coagulating/precipitating the resultant elastomer and partially exfoliated, intercalated clay particles.

Representative of various well known water swellable clays composed of stacked platelets which contain water swellable galleries between the platelets and cation exchangeable ions with the galleries are the smectite class of clays which include, for example, montmorillonite clays which are often preferable.

In practice, a relatively high concentration of the exfoliated, intercalated clay in the elastomer of the nanocomposite can be provided such as, for example, from about 1 to even up to about 80, alternately from about 1 to about 45, parts by weight of dispersed clay particles per 100 parts by weight of elastomer. On this basis, then, the composite may be somewhat as a masterbatch to be blended with another elastomer(s) so that the overall concentration of the clay particles in the resulting elastomer blend is significantly reduced.

In the practice of this invention, the aforesaid use of a quantitative amount of at least 55 phr of the BR in the rubber composition of this invention is considered herein to be important in order to enhance resistance to abrasion for the tire tread.

Use of an additional elastomer such as the cis 1,4-polyisoprene, preferably natural cis 1,4-polyisoprene rubber, is considered herein to be important in order to enhance processability of the tire tread rubber composition with a relatively minimum amount of processing oil and processing additives which are considered herein to normally adversely offset abrasion resistance.

The addition of the cis 1,4-polyisoprene natural rubber is also considered herein to be important to contribute to tear resistance property for the tread rubber composition.

As hereinbefore discussed, use of rubber reinforcing carbon black(s) for this invention, with the characterized Iodine adsorption value range and DBP number range, is considered herein to be important in order to provide good abrasion resistance, or coefficient of friction, and higher stiffness for the tire cornering and handling, and also enhanced, or relatively high hysteresis for relatively good traction for a tire tread.

Representative of such rubber reinforcing carbon blacks are, for example, N121 and N205 as ASTM designated carbon backs. Such representative carbon blacks, including N121 and N205 carbon blacks, have an Iodine adsorption number within a range of about 110 to about 145 g/kg and a DBP number in a range of about 110 to about 140 cm$^3$/g. Examples of reinforcing carbon blacks for elastomers, generally, together with their Iodine number values and DBP (dibutyl phthalate) absorption values, may be found in *The Vanderbilt Rubber Handbook*, (1990), 13th edition, Pages 416 through 419.

In the practice of this invention, use of the specific combinations of the aforesaid silica-rich, multiphase elastomer blend and coupling agent together with the exfoliated clay platelets are considered herein to be important in order to optimize resistance to abrasion (treadwear) and to provide a suitable hysteresis (i.e. traction).

In practice, it is preferred that the elastomers utilized in the tread composition are exclusive of polymers and copolymers of isobutylene, including halogen modifications thereof.

As hereinbefore pointed out, the invention is based upon use of individual elastomers, silica and coupling agent, together with the exfoliated clay platelets, most of which are usually known, in what is considered herein as a novel combination as to (A) selection of specific individual materials, and (B) combining the selected specific materials in novel combinations in terms of individual amounts in a manner not believed to be specifically heretofore used for a tire tread.

This aspect of the invention is considered particularly important for creating a tire tread rubber composition with good abrasion properties coupled, also, with good traction, or coefficient of friction, or hysteresis, properties.

In practice, the commonly employed amorphous silica is used is usually a precipitated silica, although the silica may be a pyrogenic silica, all which are well known to those having skill in such art.

The precipitated silicas are in a form of aggregates thereof which may be obtained, for example, by the acidification of a soluble silicate, e.g., sodium silicate or a co-precipitation of a silicate and an aluminate with an inclusion of a suitable electrolyte to promote formation of silica aggregates.

The BET surface area of the silica, as measured using nitrogen gas, may, for example, be in a range of about 50 to about 300, alternatively about 120 to about 200, square meters per gram. A BET method of measuring surface area is described in the *Journal of the American Chemical Society*, Volume 60, Page 304 (1930).

The silica may also have a dibutylphthalate (DBP) absorption value in a range of about 100 to about 400, and usually about 150 to about 300 cm$^3$/100 g.

Various commercially available silicas may be considered for use in this invention such as, for example, only and without limitation, silicas commercially available from PPG Industries under the Hi-Sil trademark with designations 210, 243, etc; silicas available from Rhodia, with such as for example of Zeosil 1165 MP™ and Zeosil165GR™ and silicas available from Degussa AG with designations VN2™ and VN3™, 3770GR™ and from Huber such as for example Zeopol 8745™.

The silica reinforcement is conventionally used with a coupling agent which also aids in coupling the exfoliated clay platelets to the diene-based elastomer(s) by reaction of the alkoxysilane moiety with hydroxyl groups contained on their surface.

Compounds capable of reacting with both the silica and exfoliated clay platelet surfaces and the rubber elastomer molecule in a manner to cause the silica and exfoliated clay platelets to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica and exfoliated clay platelet processing, or mixing, stage. If the coupling agent is added to the rubber mixture during a rubber mixing stage separately from the silica and exfoliated clay platelets, it is considered that the coupling agent then combines in situ within the rubber host with the silica and exfoliated clay platelets.

In particular, as hereinbefore discussed, such coupling agents may, for example, be composed of a silane which has a constituent component, or moiety, (the silane portion) capable of reacting with the silica and exfoliated clay platelet surfaces and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and exfoliated clay platelets and the diene-based rubber and thereby enhances the rubber reinforcement aspect of the silica and exfoliated clay platelets.

In one aspect, the silane of the coupling agent apparently forms a bond to the silica and exfoliated clay platelet surfaces, possibly through hydrolysis, and the rubber reactive component of the coupling agent combines with the rubber itself.

Numerous coupling agents may be used, including usually those taught for use in combining silica and rubber such as, for example, and as hereinbefore discussed, silane coupling agents containing a polysulfide component, or structure, such as bis-(3-alkoxysilylalkyl) polysulfide which contains primarily from 2 to 6 sulfur atoms in its polysulfidic bridge with an average of from 2 to 4, alternately an average of from 2 to 2.6 or an average of from 3.5 to about 4, preferably an average of from 2 to 2.6, connecting sulfur atoms in its polysulfidic bridge such as, for example, a bis-(3-triethoxysilylpropyl) polysulfide.

As hereinbefore discussed, a contemplated coupling agent is a bis-(3-ethoxysilylpropyl) polysulfide material having from 2 to 6, with an average, for example, of from 2 to 2.6 connecting sulfur atoms in the polysulfide bridge. Such ethoxysilane polysulfide coupling agent is particularly preferred, as compared to such a coupling agent having a significantly higher average of from 3 to 4 connecting sulfur atoms in its polysulfidic bridge, in order to provide enhanced ease of processing, particularly mixing, the unvulcanized rubber composition.

However, as also hereinbefore discussed, a coupling agent may be used which contains an alkoxysilane moiety for reaction with hydroxyl groups contained on the partially exfoliated, intercalated, clay particles, as well as hydroxyl groups contained on the silica (e.g. silanol groups) if silica is used, and a mercapto functionality, or moiety, for reaction with the diene-based elastomer(s).

Representative of such coupling agent is, for example, an organomercapto alkoxysilane such as for example, mercaptopropyl triethoxysilane. Alternately, such coupling agents with a mercapto functionality, or moiety, may be used in which the mercapto functionality, or moiety, has been blocked by a moiety which is itself labile and in which the blocked mercapto functionality may be deblocked under the rubber vulcanization conditions of elevated temperature to provide the rubber reactive mercapto functionality. Thus an appropriate organomercapto alkoxysilane such as, for example, mercaptopropyl triethoxysilane, with its mercapto group blocked by such a moiety (organomercapto trialkylsilane, or mercaptopropyl triethoxysilane having a blocked mercapto moiety with a moiety which capable of being deblocked at an elevated temperature) may be used for which its mercapto moiety is then deblocked during vulcanization of the associated rubber composition at an elevated temperature such as, for example, a temperature in a range of from about 140° C. to about 160° C. For example, see U.S. Pat. Nos. 6,127,468, 6,204,339, 6,414,061, 6,528,673 and 6,608,125 which are incorporated herein in their entirety.

Additionally, the coupling agent may be used as an additive for in situ reaction with the hydroxyl group-containing fillers, namely the partially exfoliated, intercalated, clay particles, as well as amorphous silica if used, or as a pre-reaction modifier to such fillers, and may be comprised of alkoxy or haloalkyl silanes in combination with polysulfidic organosilanes or organomercaptosilanes. The alkoxy and haloalkyl silanes may react with the hydroxyl groups of such fillers to supplement the coupling performance of the polysulfidic organosilanes or organomercaptosilanes.

Accordingly, said amorphous silica may be provided as a pre-formed reaction product of precipitated silica which contains hydroxyl groups on its surface and the coupling agent as a co-reactant.

In one aspect, the amorphous silica may be provided as a pre-formed reaction product of precipitated silica and a co-reactant as polysulfidic organosilane as a bis(3-alkoxysilylalkyl) polysulfide, and particularly a bis(3-triethoxysilylpropyl) polysulfide, having an average of from about 2 to about 4 connecting sulfur atoms in its polysulfidic bridge.

In one aspect, the amorphous silica may be provided as a pre-formed reaction product of precipitated silica and a co-reactant as an organomercapto alkoxysilane or organomercapto alkoxysilane in which its mercapto functionality has been blocked by a moiety which is capable of being deblocked during vulcanization of the associated rubber composition at an elevated temperature such as, for example, a temperature in a range of from about 140° C. to about 160° C.

In one aspect, the amorphous silica may be provided as a pre-formed reaction product of precipitated silica and a co-reactant as a combination of said bis(3-trialkoxysilylalkyl) polysulfide or organomercapto allkoxysilane with an alkoxysilane or haloalkyl silane.

In one aspect, the amorphous silica may be provided as a pre-formed reaction product of a precipitated silica and a co-reactant as a combination of alkoxy silane or haloalkyl silane with an organomercapto alkoxysilane in which its mercapto functionality has been blocked by a moiety which is capable of being deblocked during vulcanization of the associated rubber composition at an elevated temperature such as, for example, a temperature in a range of from about 140° C. to about 160° C.

In practice, said alkoxy alkylsilane may, for example, be represented as the general formula (I):

$$(RO)_n\text{—Si—}R^1_{4-n} \qquad (I)$$

where R is selected from methyl and ethyl radicals, $R^1$ is an alkyl radical containing from one to twenty carbon atoms and n is a value of from 1 to and including 3.

In practice, said haloalkyl silane may, for example, be represented as the general formula (II):

$$(X)_n\text{—Si—}R^1_{4-n} \qquad (II)$$

where X is a halogen selected from chlorine or bromine and $R^1$ is an alkyl radical containing from one to twenty carbon atoms.

In practice, said organomercapto alkoxysilane may, for example, be represented as the general formula (III):

$$(RO)_3\text{—Si—}R^2\text{—SH} \qquad (III)$$

where R is selected from methyl and ethyl radicals and $R^2$ is an alkylene radical containing from one to six, preferably three, carbon atoms.

It is readily understood by those having skill in the art that the rubber compositions of the tread would be compounded with conventional compounding ingredients including the aforesaid reinforcing fillers such as carbon black and precipitated silica, as hereinbefore defined, in combination with a silica coupling agent, as well as antidegradant(s), processing oil as hereinbefore defined, stearic acid or a zinc stearate, zinc oxide, sulfur-contributing material(s) and vulcanization accelerator(s) as hereinbefore defined.

Such compounding of rubber is well known to those having skill in such art. Antidegradants are typically of the amine or phenolic type. While stearic acid is typically referred to as a rubber compounding ingredient, it may be pointed out that the ingredient itself is usually obtained and used as a mixture of organic acids primarily composed of stearic acid with at least one of oleic acid, linolenic acid and/or palmitic acid normally contained in the stearic acid as typically used. The mixture may contain minor amounts (less than about six weight percent) of myristic acid, arachidic acid and/or arachidonic acid. Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, waxes such as microcrystalline and paraffinic waxes typically used in a range of about 1 to 5 phr and often in a range of about 1 to about 3 phr; and resins, usually as tackifiers, such as, for example, synthetic hydrocarbon and natural resins typically used in a range of about 1 to 5 phr and often in a range of about 1 to about 3 phr. A curative might be classified as a combination of sulfur and sulfur cure accelerator(s) for the rubber compound (usually simply referred to as accelerator) or a sulfur donor/accelerator. In a sulfur and accelerator(s) curative, the amount of sulfur used is in a range of about 0.5 to about 5 phr and usually in a range of about 0.5 to about 3 phr; and the accelerator(s), often of the sulfenamide type, is (are) used in a range of about 0.5 to about 5 phr and often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of about 145° C. to about 185° C., and such mixing stages are typically referred to as non-productive mixing stages. Thereafter, the sulfur and accelerators, and possibly one or more retarders and one or more antidegradants, are mixed therewith to a temperature of about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art. In such case of retreading of a tire, the tire tread might first be precured and then applied to the already cured tire carcass with a curable gum strip between the tread and carcass and the assembly then submitted to curing conditions to cure the aforesaid gum strip.

The invention may be better understood by reference to the following example in which the parts and percentages are by weight unless otherwise indicated.

EXAMPLE I

A rubber composition comprised of cis 1,4-polybutadiene rubber (BR) and solution polymerization prepared styrene/butadiene elastomer, and silica, including a coupling agent, was prepared and referred to herein as Control Sample A.

A similar rubber composition was prepared in which the elastomer component was provided as cis 1,4-polybutadiene (BR) and a composite of an emulsion polymerization prepared styrene/butadiene elastomer (E-SBR) and an inclusion of in situ formed (within an emulsion of the E-SBR) partially exfoliated, intercalated clay platelets and referred to herein as Sample B.

Control Sample A and Sample B are illustrated in the following Table 1.

All of the Samples utilize the BR together with various typical rubber compounding ingredients.

The Samples were prepared by mixing the ingredients, other than the sulfur and accelerator curatives, in a first non-productive mixing step in an internal rubber mixer for about 5 minutes to a temperature of about 170° C. at which time the rubber mixture was dumped from the mixer, sheeted out via open roll milling and allowed to cool to a temperature below 40° C. Then the rubber mixture was mixed with sulfur and accelerator(s) in an internal rubber mixer in a productive mixing step for about 2 minutes to a temperature of about 110° C. at which time the mixture was dumped from the mixer, sheeted out via open roll milling and allowed to cool to a temperature below 40° C.

Non-productive mixing, followed by productive mixing, with the cooling of the rubber mixture between the mixing steps, of the rubber and associated ingredients is well known to those having skill in such art.

TABLE 1

| Material | Control Sample A | Sample B |
|---|---|---|
| Non-productive mixing (to 170° C.) | | |
| Cis 1,4-polybutadiene elastomer (BR)[1] | 30 | 70 |
| S-SBR (12% styrene)[2] | 70 | 0 |
| E-SBR composite[3] (46% styrene) (30 parts E-SBR plus 3 parts in situ exfoliated, intercalated clay particle dispersion) | 0 | 33 |
| Silica[4] | 70 | 60 |
| Silica coupler/carbon black composite[5] | 11 | 11 |
| Aromatic oil[6] | 28 | 25 |
| Wax[7] | 3 | 3 |
| Stearic acid | 2 | 2 |
| Zinc oxide | 3 | 3 |
| Productive mixing (to 110° C.) | | |
| Sulfur | 2 | 2 |
| Accelerator(s)[8] | 3.3 | 3.3 |

[1]A cis 1,4-polybutadiene elastomer (branched BR) prepared by polymerization of 1,3-butadadiene monomer in the presence of an organonickel as a nickel salt of a carboxylic acid, trialklyaluminum, hydrogen fluoride and para-styrenateddiphenylamine as hereinbefore described. The BR is reported above on a dry weight basis, having a high cis 1,4-content of at least 96 percent and having and a Tg of about −100° C. obtained as Budene ® 1280 from The Goodyear Tire & Rubber Company.
[2]A solution polymerization prepared styrene/butadiene copolymer elastomer (S-SBR), reported above on a dry weight basis, having a styrene content of about 12 percent and a Tg of about −42° C. obtained from The Goodyear Tire & Rubber Companyas Solflex 1216 ™.
[3]A composite of emulsion polymerization prepared styrene/butadiene copolymer elastomer (E-SBR) containing a dispersion of ten parts by weight per 100 parts by weight E-SBR of partially exfoliated, intercalated montmorillonite clayplatelets, reported above on a dry weight basis, with the styrene/butadiene elastomer containing about 46 percent bound styrene (BS) and having a Tg of about −35° C. obtained from The Goodyear Tire & Rubber Company (oil extended with 37.5 phr ofaromatic rubber processing oil). The composite was prepared by blending a water slurry of montmorillonite clay with a pre-formed emulsion of the styrene/butadiene elastomer particles and the clay intercalated in situ within the emulsion by addition of apolymeric quaternary amine to also coagulate said elastomer/clay particles and provide the partially exfoliated, intercalated clay particle dispersion.
[4]Obtained as Zeopol 8745 from the J. M. Huber Company
[5]A 50/50 composite of carbon black and bis-(3-triethoxysilylpropyl) disulfide material from Degussa A. G. as X266S ™.
[6]The oil includes both an added aromatic rubber processing oil as well as the oil contained in the oil extended elastomers.
[7]A mixture of microcrystalline and paraffin waxes
[8]Accelerators as sulfenamide type and diphenylguanidine The prepared Samples were evaluated for their physical properties (rounded numbers are reported herein) as shown in the following Table 2. The rubber composition Control Sample A and Sample B correspond to Control Sample A and Sample B of Table 1.

TABLE 2

| | Control Sample A | Sample B |
|---|---|---|
| Elastomers | | |
| Cis 1,4-polybutadiene (BR), Tg = −100° C. | 30 | 70 |
| S-SBR[2] (12% styrene), Tg = −42° C. | 70 | 0 |
| E-SBR composite[3] (46% styrene), Tg = −35° C. (100 parts E-SBR plus 3 parts in situ exfoliated, intercalated clay particle dispersion) | 0 | 33 |
| Property | | |
| Cold rebound, zwick, (%) at 0° C. | 23 | 22 |
| Rebound, zwick (%) at 23° C. | 41 | 41 |
| Ultimate elongation (%) | 496 | 592 |
| 300% modulus (MPa) | 8.1 | 7.5 |
| 100% modulus (MPa) | 1.6 | 1.7 |
| Ultimate tensile strength (MPa) | 16 | 17.6 |

TABLE 2-continued

|  | Control Sample A | Sample B |
|---|---|---|
| Shore A hardness (23° C.) | 64 | 64 |
| DIN abrasion (volume loss, cc) | 115 | 79 |
| Specific gravity | 1.168 | 1.153 |

DIN abrasion data (DIN No. 53516 at 10 Newtons) for the Control Sample A and Sample B is reported in the above Table 2 as relative volume loss, a representation well known to those having skill in such art. The lower the value the better the predicted tread wear performance (better performance is lower treadwear). This data demonstrate an improve wear resistance for the nanocomposite containing Sample B as compared to Control Sample A.

It can readily be seen from Table 2 that both lower rebound value at 0° C. and DIN abrasion volume loss is evidenced for Sample B as compared to Control Sample A which is predictive of better traction and better resistance to abrasion for a tire tread of such rubber composition.

This is considered to be significant because it is considered herein to normally be difficult to balance tire performance in a manner of reducing treadwear (better resistance to abrasion) without sacrificing traction.

The SBR composite with its high Tg and high styrene content is seen herein as being relatively immiscible with the significantly lower Tg BR.

The advantage of the relative immiscibility of the SBR composite dispersed phase in the BR continuous phase of Sample B is evident in comparison to the blend of miscible elastomers of Sample A, namely the blend of the lower Tg and lower styrene containing styrenelbutadiene elastomer with the BR.

In particular, in Sample B, the contribution of the significantly lower DIN abrasion contribution of the BR continuous phase is not significantly affected by the presence of the high styrene-containing styrene/butadiene composite dispersed phase whereas such contribution by the BR in Sample A is masked by the presence of the miscible lower Tg, lower styrene-containing styrene/butadiene elastomer.

Furthermore, the experimental Sample B, which contained the nanocomposite, namely the composite of high Tg, high styrene styrene/butadiene elastomer and dispersion of in situ formed partially exfoliated, intercalated clay particles, showed improved ultimate tensile strength and ultimate elongation physical properties as compared to Control Sample A. This is predictive of improved durability of a tire tread.

The rebound values at 23° C. (room temperature rebound) are indicative of substantially equivalent tire rolling resistance (equivalent resistance to rolling which normally translates to equivalent fuel economy for an associated vehicle) for Sample B as compared to Control Sample A for a tire with a tread of such rubber composition. Therefore it is expected that a tread of Sample B would provide substantially equal performance to a tread of Control Sample A insofar as tire rolling resistance properties are concerned.

This is considered to be significant because it is normally considered herein to be difficult to maintain rolling resistance (e.g. substantially maintain rebound values) while improving traction and reducing tread wear (e.g. reducing abrasion resistance).

In addition, the reinforcement and stiffness of the rubber composition for Sample B is substantially maintained as compared to Control Sample A as indicated by the modulus values (100 percent and 300 percent modulus values) and the shore A hardness values. This is indicative of similar tire handling characteristics for a tire having a tread of such rubber compositions.

This is considered to be significant because less reinforcing filler (the exfoliated, intercalated clay particles) is used which results in a lighter weight rubber composition (the lower specific gravity shown in Table 2) while providing significant physical properties of the rubber composition.

Therefore, a significant aspect of this invention, as illustrated in this Example, is improved abrasion resistance of the rubber composition (indicative of reduction in tread wear) and durability of a tire tread while substantially improving indicative tire tread traction and maintaining handling and rolling resistance values. It is to be appreciated that a satisfactory balance of all of these properties in a single tire tread is normally difficult to obtain. Indeed, usually when tire tread wear is improved (tread wear is reduced), it is at the expense in a reduction of one or more of tread traction and handling.

Indeed, this significant aspect was observed with significantly less reinforcing filler and an overall lighter rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a circumferential rubber tread where said tread is a rubber composition comprised of a blend of, based on parts by weight per 100 parts by weight (phr), (A) conjugated diene-based elastomers comprised of
(1) a major continuous rubber phase comprised of from 55 to about 85 phr of cis 1,4-polybutadiene rubber (BR) having a cis 1,4-microstructure content of at least 95 percent and a single Tg within a range of about −98° C. to about −107° C.;
(2) a minor dispersed rubber phase comprised of about 15 to about 45 phr of at least one emulsion polymerization prepared elastomeric high styrene-containing styrene/butadiene copolymer rubber having a bound styrene content in a range of about 35 to about 55 percent and a single Tg within a range of from about −20° C. to about −45° C., as a composite thereof containing from about 1 to about 80 parts by weight of at least partially exfoliated, intercalated clay particles per 100 parts by weight of the styrene/butadiene copolymer rubber as a dispersion therein,
wherein the Tg of said cis 1,4-polybutadiene elastomer major rubber phase is at least 55° C. lower than the Tg of said emulsion polymerization derived high styrene containing styrene/butadiene elastomer minor rubber phase; and (B) about 35 to about 110 phr of reinforcing filler comprised of from about 5 to about 105 phr amorphous silica and from about 5 to about 105 phr of high structure carbon black reinforcing filler;
wherein said high structure carbon black is characterized by having an Iodine value in a range of about 116 to about 135, g/kg together with a DBP (dibutylphthalate) value in a range of about 125 to about 140, cm3/100 g; and, (C) a coupling agent having a moiety reactive with hydroxyl groups contained on the surface of said silica and said clay particles and another moiety interactive with at least one of said diene-based elastomers.

2. The tire of claim 1 wherein said coupling agent is:
(A) a bis(3-trialkoxysilylalkyl) polysulfide which contains an average of from 2 to 4 connecting sulfur atoms in its polysulfidic bridge, or
(B) an organomercapto alkoxysilane wherein its mercapto functionality has been blocked with a moiety which is itself labile and in which the blocked mercapto functionality may be deblocked under rubber sulfur vulcanization conditions of elevated temperature in a range of from 140° C. to about 160° C. to provide a rubber reactive mercapto functionality.

3. The tire of claim 2 wherein said coupling agent is a bis(3-triethoxysilylpropyl) polysulfide which contains an average of from 2 to 4 connecting sulfur atoms in its polysulfidic bridge.

4. The tire of claim 2 wherein said coupling agent is a bis(3-triethoxysilylpropyl) polysulfide which contains an average of from about 2 to about 2.6 connecting sulfur atoms in its polysulfidic bridge.

* * * * *